UNITED STATES PATENT OFFICE.

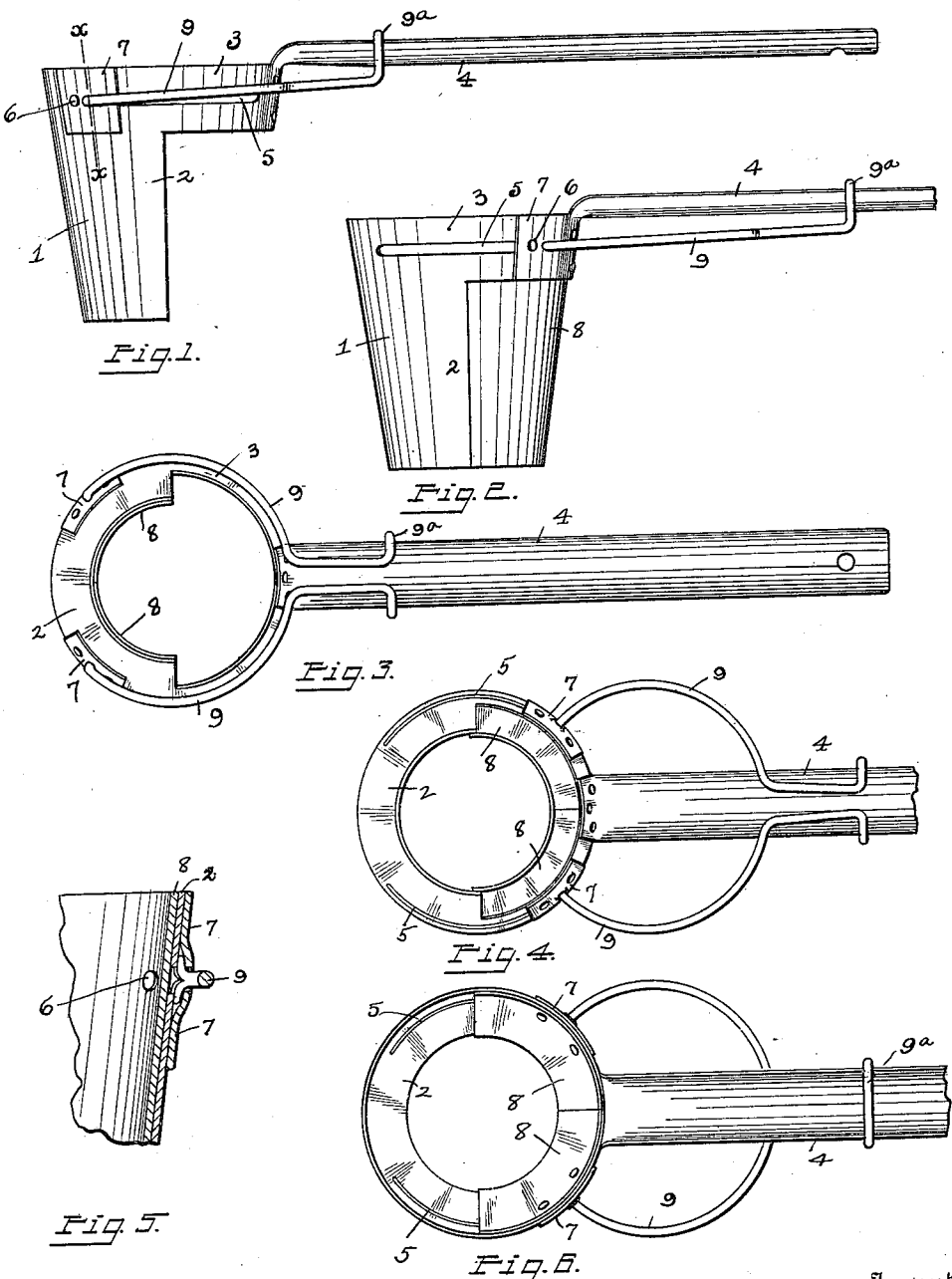

ROBERT A. D. COLMERY, OF MOUNT GILEAD, OHIO.

ICE-CREAM LADLE OR CUP.

993,508. Specification of Letters Patent. Patented May 30, 1911.

Application filed May 21, 1910. Serial No. 562,577.

*To all whom it may concern:*

Be it known that I, ROBERT A. D. COLMERY, a citizen of the United States, residing at Mount Gilead, in the county of Morrow and State of Ohio, have invented certain new and useful Improvements in Ice-Cream Ladles or Cups, of which the following is a specification.

My invention relates to the improvement of ice cream ladles or cups of that class which are adapted for the ready removal of ice cream from a freezer or other receptacle, and the objects of my invention are to provide an improved ladle of this class by means of which a predetermined quantity of ice cream may be removed from the receptacle and by means of which the ice cream engaged by the ladle may be molded or shaped to a substantially cone form; to so construct my improved ladle or cup as to permit of its being utilized for the filling of conical containers which are known as ice cream cones. These objects I accomplish in the manner illustrated in the accompanying drawing, in which—

Figure 1 is a side elevation of my improved device showing the same in its open position, Fig. 2 is a similar view showing the movable ladle sections closed, Fig. 3 is an underside view showing the movable section open, Fig. 4 is a similar view showing the movable section closed, Fig. 5 is an enlarged sectional view on line x—x of Fig. 1, and, Fig. 6 is a plan view showing the ladle or cup sections closed.

Similar numerals refer to similar parts throughout the several views.

In constructing the ladle or cup body, I employ a fixed section and movable sections connected therewith. 1 represents the fixed section which comprises a cylindrical tapering body of cone frustum shape, one-half of said body being cut away from a point below the upper end thereof, resulting in the formation of the semi-cylindrical and tapered body 2, the unrecessed upper portion thereof forming a half band projection 3. To the outer face of the projecting portion 3, is secured one end of an outwardly extending handle 4 of suitable form. In opposite sides of the upper portion of the cup or ladle body are provided opposing slots 5 and through each of these slots pass loosely one or more rivets or suitable connecting members 6, said rivets forming rigid connections between external plates 7 and internal cup sections 8. Each of these internal cup sections, is in the nature of a tapering cup segment, said sections being when their edges are joined together, of a size equal to one-half the size of the cup or ladle body. With the plates 7 which are curved to conform to the curvature of the upper portion of the ladle body, are connected respectively the ends of a spring wire yoke 9 which is formed of one piece of wire and has its outer members brought together beneath the handle 4 and thence bent upwardly or looped loosely over the upper side of said handle to form a finger or bridge piece 9ª. When the spring wire member thus described, is drawn outward to its uttermost position, the yoke portion thereof forms the greater part of a circle and it will be understood that when the wire finger piece or bridge member 9ª is moved along the handle toward the body of the cup, the opposing wire yoke members will be expanded and the opposing plate members 7 and the movable sections 8 which are connected with said plates 7, will be moved in circular paths until said sections 8 cover the inner surface of the fixed section 2, thus leaving the greater portion of that side of the ladle body which is toward the handle, open, and converting the ladle into an open end scoop. It is obvious that the rivets or other connecting devices which connect the sections 8 and plates 7, will during the movement described, slide within the slots 5 of the stationary ladle section.

In utilizing my device, it is obvious that the ladle body having its movable sections in their closed positions, may be used as an open-end cup and that the ice cream in the freezer or other receptacle may be scooped into the cup from the larger end thereof, thus filling the cup, after which by pressing the wire bridge member 9ª toward the cup body, the sections 8 may be moved into contact with the inner surface of the body 2, thereby permitting the substantially conical body of ice cream contained in the cup body to move downward and outward into a baked cone or other suitable container. It is also obvious that my device may be utilized when the movable sections 8 are in their open positions or closed against the fixed sections, by inserting the ladle into the cream, scooping it toward the operator and then closing the movable sections about the body of cream to impart thereto the desired form, after which the movable sections may be opened and the ice cream body discharged therefrom. It will be understood that either of the operations described may be employed or that the cream may be scooped into the completed cup or ladle body and the cup or ladle inverted so as to drop the larger end of the body of cream outward on to a dish if desired.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is—

1. In an ice cream ladle and mold, the combination with a semi-tubular ladle section having a circular head formed with an inwardly extending semi-circular flange, of tube sections slidably connected at their upper edge portions with said ladle sections and disconnected from said sections at their lower edge portions, a handle projecting from the circular head of the semi-tubular member, and means connected with said sliding segments for moving the same inward against the flange of the head.

2. In an ice cream ladle and mold, the combination with a semi-tubular ladle section having a circular head extending beyond the body of said section and provided with an inwardly extending semi-circular flange, and a handle member connected with said head, of separately formed sections slidably connected at their upper edge portions with said semi-tubular section and disconnected at their lower edge portions from said section, a yoke having its opposite ends engaging said slidable members and having an extension slidably engaging the handle, the construction being such that said sections may be moved inward against the flange to open the ladle.

3. In an ice cream ladle and mold, the combination with a semi-tubular section provided with an approximately circular head having slots formed therein and having an inwardly extending semi-circular flange, of slidable tube sections having means movable within the slots of the heads, and means for actuating the tube sections whereby the latter may be moved inward against the flange to open the ladle.

In testimony whereof I affix my signature in presence of two witnesses.

ROBERT A. D. COLMERY.

Witnesses:
J. W. BARRY,
H. O. ALLISON.

---

Copies of this patent may be obtained for five cents each, by addressing the "Commissioner of Patents, Washington, D. C."